Patented Aug. 30, 1938

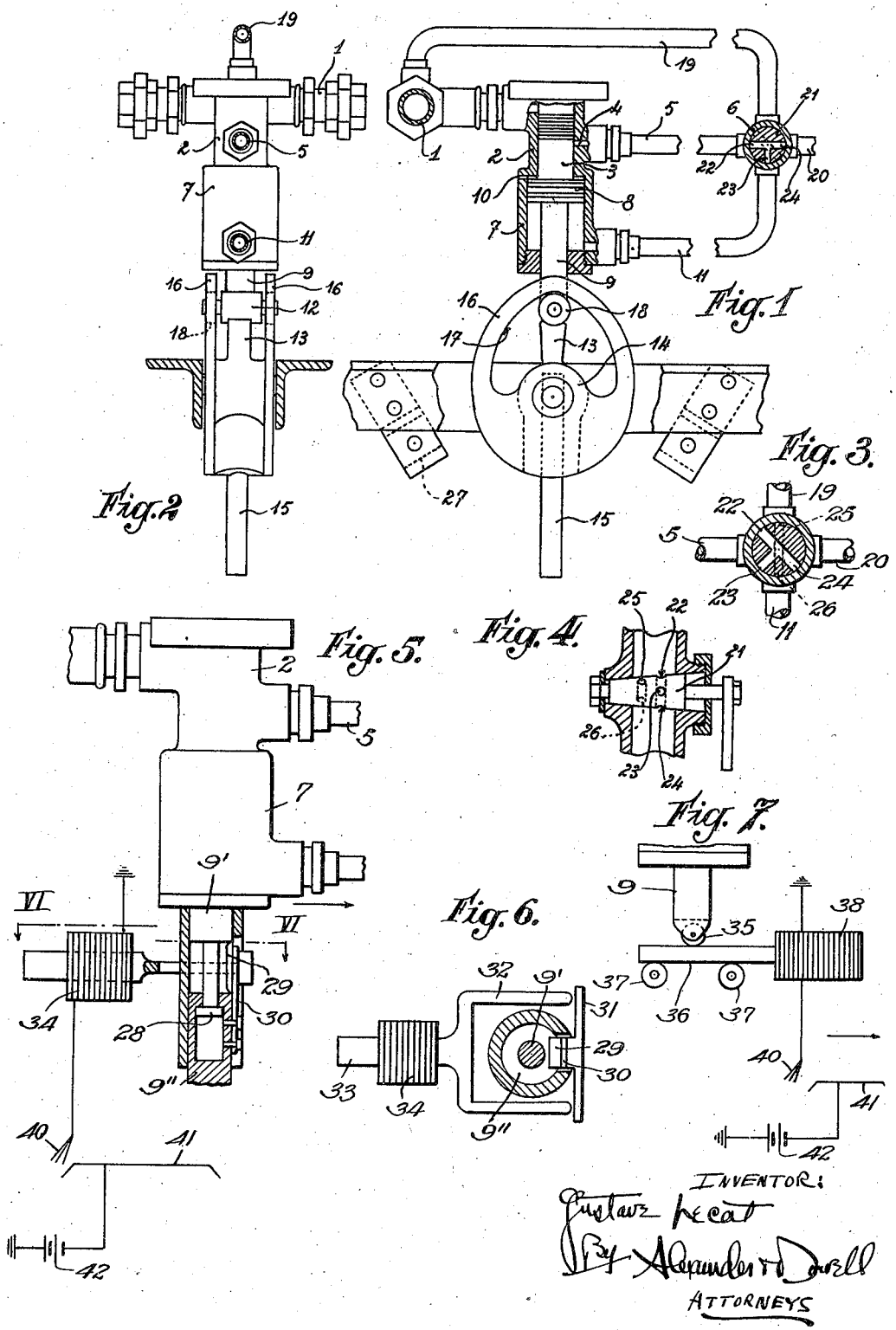

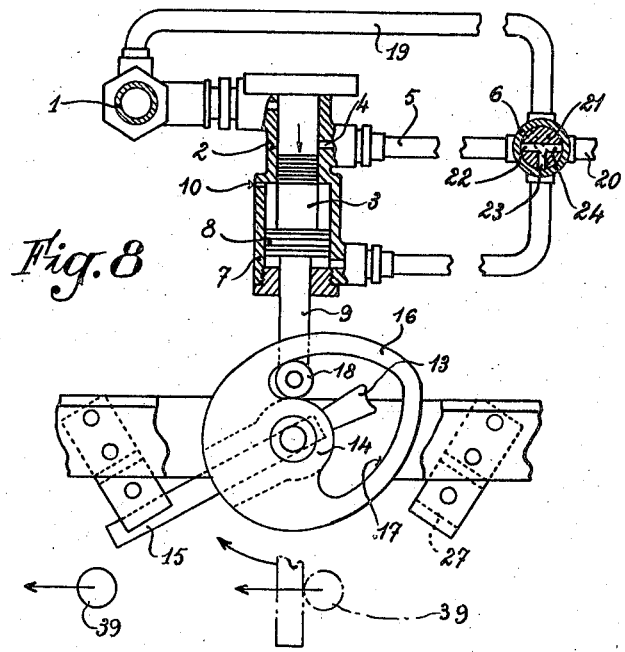

2,128,830

UNITED STATES PATENT OFFICE 2,128,830

SAFETY DEVICE FOR RAILWAY VEHICLES AND THE LIKE

Gustave Lecat, Villefranche-sur-Saone, France

Application September 27, 1937, Serial No. 166,007
In France November 13, 1936

5 Claims. (Cl. 246—200)

This invention relates to a safety device for railways of the kind in which an abutment fixed on the track displaces a lever carried by the locomotive or other vehicle, the said lever operating a valve which applies the brakes.

A first object of my invention is to enable the driver to control the brakes when the valve has been released in order to avoid a too powerful braking action when the latter is not required, for instance when the train is running at reduced speed.

Another object of my invention is to permit the driver to re-load the device after it has been tripped without having to stop the train or vehicle.

A further object of my invention is to provide the device with an auxiliary electromagnetic tripping gear to permit of its actuation by any kind of electric control circuit.

My invention broadly consists in forming the controlling valve as a cylinder with axially movable piston, the latter being connected with a re-loading piston of larger diameter, the proper distribution of compressed air being effected by a rotary multi-way hand valve. The common rod of the two pistons is normally retained by a nose carried by a lever pivoted on the vehicle and adapted to be swung by an abutment on the track; and the said lever is associated with a cam cooperating with follower members at the end of the piston rod, in such a way that when the device is re-loaded the movement of the rod positively rotates the said cam and thereby returns the lever to its original position. Thus by operating the multi-way hand valve, the driver re-loads the device and may therefore control at will the actuation of the brakes.

The piston rod may also be formed in two parts connected together by means of a disengageable key which can be tripped by an electromagnet. The device may thus be operated either mechanically by an abutment properly disposed on the track, or electrically by any appropriate control circuit.

In the annexed drawings:

Fig. 1 is a general side view partly in section, of a safety device according to my invention.

Fig. 2 is an end view thereof.

Fig. 3 is a partial transverse section of the multi-way valve at the position corresponding to the re-loading of the device.

Fig. 4 is an axial section of the multi-way valve.

Fig. 5 shows a device provided with an auxiliary electromagnetic tripping gear.

Fig. 6 is a transverse section thereof taken on line VI—VI of Fig. 5.

Fig. 7 is a partial view of a modification.

Figs. 8 and 9 are views similar to Fig. 1 but at different positions of the parts.

In Figs. 1 and 2, 1 designates the train pipe of a compressed air brake system; 2 is a cylinder vertically carried under the vehicle, the latter being for instance a locomotive. Cylinder 2 encloses a piston 3 which forms a sliding valve with respect to an opening 4 connected by a pipe 5 with a four-way hand valve 6.

Beneath cylinder 2 and disposed co-axially of the same there is provided another cylinder 7 of larger diameter cooperating with a piston 8 which is fixed to the lower end of piston 3 as shown. Piston 8 is also fixed to a rod 9 which passes downwardly through the cover of cylinder 7. The space above piston 8 communicates with the atmosphere through a hole 10. The space beneath piston 8 is connected with valve 6 by a pipe 11.

Rod 9 terminates downwardly into a transverse cylindrical end 12 (Fig. 2) which normally rests in a depression provided at the end of a nose 13 rigidly attached to a hub 14 pivotally carried by the frame of the vehicle. Hub 14 carries a downwardly depending arm 15, preferably tubular or made of light metal.

Two cams 16 are laterally fixed to hub 14, these cams having a more or less crescent-shaped opening the outer edge 17 of which forms the active portion of the cam. Cams 16 co-act with rollers 18 pivotally supported at the ends of the transverse cylindrical part 12.

The hand control valve 6 has four ways, two of which are connected with pipes 5 and 11 as above explained. A third way is directly connected with the brake pipe 1 by a branch pipe 19, and the fourth way is connected with a pipe 20 opening to the atmosphere either directly or through an additional control valve not shown, such additional valve being normally open. The plug 21 of valve 6 (Fig. 4) is provided with two rows of ports; the first row comprises three intercommunicating transverse ports 22, 23 and 24 arranged in T formation; the second row comprises two intercommunicating opposed ports 25 and 26 forming a single transverse passage obliquely disposed with respect to the first row as clearly shown in Figs. 1 and 3.

The normal position of plug 21 is shown in Fig. 1; pipes 5, 11 and 20 are connected together by ports 22, 23 and 24 while pipe 19 is closed. The re-loading position of plug 21 is shown in Fig. 3;

pipes 11 and 19 are connected with one another by ports 25 and 26 while pipes 5 and 20 are closed and separated from one another.

The normal or loaded position of the gear proper is shown in Fig. 1. The compressed air from pipe 1 acts downwardly on piston 3, but rod 9 is retained by nose 13. The space below piston 8 is in communication with the outer atmosphere through pipe 11, ports 23, 24, and pipe 20.

When arm 15 strikes an abutment 39 (Fig. 8) fixed on the track, nose 13 rotates either towards the left or towards the right according to the direction of movement of the vehicle. Rod 9 is thus released and piston 3 is depressed, uncovering opening 4. The brake line 1 thus communicates with the outer atmosphere through pipes 5 and 20 and the brakes are automatically applied.

To re-load the mechanism the driver brings the plug 21 of the hand control valve to the position of Fig. 3. Pipe 5 is then closed and the exhaust of compressed air from pipe 1 is stopped. The pressure of the line through pipe 19, ports 25, 26, and pipe 11 acts upwardly on the lower face of piston 8. Since piston 8 is materially larger in diameter than piston 3, this upward action is greater than the downward action on the latter and the pistons are returned to the position shown in Fig. 1, while rollers 8 act on the cam edges 17 and positively bring cams 16 and the parts associated therewith back to their normal position. Fig. 9 shows the position of the mechanism during this return motion, it being explained that the plug 21 is shown in cross-section through the plane of ports 25 and 26. The control plug is then manually returned to the position shown in Fig. 1.

In order to avoid any mistake, a spring could be provided to return automatically plug 21 to its normal position.

The driver is thus obliged to re-load the safety mechanism in order to release the brakes, which ensures that the mechanism will never be left in an inactive position. The operation may be recorded either by a breakable seal attached to the controlling handle of plug 21 or by a small compressed air piston connected with pipe 11 and driving a pen or pencil on the vehicle diagram.

As illustrated the swinging motion of lever 15 is limited by abutments 27 made of lead, fiber, leather, etc.

Of course the mechanism may be disposed either along the axis of the track or somewhat laterally thereof in order to clear the electric contact ramps, if necessary; the track abutment should be located correspondingly. When snow, frost, etc., render inconvenient the arrangement of movable abutments on the ground, the mechanism may be placed on the side or top of the vehicle, the fixed abutment then being carried by an appropriate support or tower.

The mechanism may comprise an auxiliary electromagnetic tripping gear as shown in Figs. 5 and 6. In this case the piston rod is divided into two parts 9' and 9" guided within a cylindrical guide fixed to the lower cover of cylinder 7. The upper part 9' is reduced in diameter at its lower end and penetrates into a housing provided in the upper end of part 9" where it carries a head 28. Parts 9' and 9" thus have a certain amount of free motion one with respect to the other. And they are keyed to one another by a key 29 interposed between the shoulder of part 9' and the end of part 9", this key being carried by a spring blade 30 fixed to part 9". Of course the guide of parts 9' and 9" has a cutaway portion to house the key 29 and associated parts.

There is fixed to key 29 a transverse bar 31 which may be acted upon by a striker fork 32 carried by the movable core 33 of an electromagnet 34.

Electro-magnet 34 is connected with an insulated brush 40 carried by the vehicle. The track circuit comprises the usual contact making ramp 41 and track battery 42. The circuit is closed through the rails and the vehicle frame as shown, the arrangement being such that brush 40 co-operates with ramp 41 during the passage of the vehicle.

When electro-magnet 34 is energized, fork 32 strikes bar 31 which disengages key 29. Part 9' is thus free to move downwardly although part 9" is still retained by nose 13 as in the case of Fig. 1. The mechanism is re-loaded by the hand-valve 6—21 as already explained. The device is thus controlled either by the usual track circuits or by emergency abutments disposed for instance in case of accidents or of any other abnormal conditions. It is to be noted that in the case of a derailment lever 15 strikes the ballast and automatically stops the train. The device might thus be fitted to any kind of carriage as a matter of safety.

Fig. 7 diagrammatically shows the case in which the mechanism is only controlled by electricity. Rod 9 carries a loose roller 35 at its lower end and the latter rests on a bar 36 supported by rollers 37 carried by the fame. Bar 36 can be actuated by an electromagnet 38. The re-loading is ensured by compressed air as in the case of Fig. 1.

I claim:

1. A safety device for railway vehicles, adapted to be actuated by tripping means located on the track, said device comprising in combination an air valve in communication with the compressed-air brake line, said valve being adapted to open automatically when it is released; means to retain said valve at the closed position, said means being adapted to be brought to inoperative position by said track tripping means; means actuated by compressed air from the brake line to return said air valve to the closed position and said retaining means to operative position; an exhaust line from said air valve to the atmosphere; and manual means to control simultaneously and in inverted relation said exhaust line and said compressed-air returning means so as to close the former when actuating the latter.

2. A safety device for railway vehicles, adapted to be actuated by tripping means located on the track, said device comprising in combination a first cylinder in communication with the compressed-air brake line; an air exhaust line to the atmosphere opening in said cylinder; a piston in said cylinder adapted to close the inlet of said exhaust line; a second cylinder in co-axial relation with respect to said first cylinder, said second cylinder being larger in diameter than said first cylinder; a piston in said second cylinder, said second-named piston being connected with said first-named piston so as to form a single unit; a branch line from the compressed-air brake line to said second cylinder having its outlet within the same so disposed that the action of compressed air in said second cylinder counteracts the action of compressed air in said first cylinder; a rod attached to said pistons; followers at the free end of said rod; a retaining lever adapted to retain said rod against the action of compressed air in said first cylinder, said lever being adapted to be brought to inoperative position by said track tripping means; manual means to control simultaneously and in inverted relation said exhaust line and said branch line so as to close the former when opening the latter; and cam means carried by said retaining lever and cooperating with said followers, said cam means being adapted to return said retaining means to operative position when said rod moves under the action of compressed air in said second cylinder.

3. A safety device for railway vehicles, adapted to be actuated by mechanical tripping means or electric contacts located on the track, comprising in combination an air valve in communication with the compressed-air brake line and opening to atmosphere, said valve embodying a rectilinearly movable valve member adapted to open automatically when released; a movable rod attached to said valve member; a second movable rod in line with said first-named rod and connected therewith with a lost motion at least equal to the operative motion of said valve member; a disengageable key adapted to maintain said rods apart as far as permissible by their mutual lost motion; means to retain said second-named rod at a position corresponding to the closure of said valve when said key is engaged, said means being adapted to be brought to inoperative position by said track tripping means; means actuated by compressed air from the brake line to return said valve member to its closed position and said retaining means to operative position; and electro-magnetic means actuated by said electric track contacts and adapted to disengage said key.

4. A safety device for railway vehicles, adapted to be actuated by mechanical tripping means or electric contacts located on the track, comprising in combination an air valve in communication with the compressed-air brake line, said valve embodying a rectilinearly movable valve member adapted to open automatically when released; a movable rod attached to said valve member; a second movable rod in line with said first-named rod and connected therewith with a lost motion at least equal to the operative motion of said valve member; a disengageable key adapted to maintain said rods apart as far as permissible by their mutual lost motion; means to retain said second-named rod at a position corresponding to the closure of said valve when said key is engaged, said means being adapted to be brought to inoperative position by said track tripping means; means actuated by compressed air from the brake line to return said valve member to its closed position and said retaining means to operative position; electro-magnetic means actuated by said electric track contacts and adapted to disengage said key; an exhaust line from said air valve to the atmosphere; and manual means to control simultaneously and in inverted relation said exhaust line and said compressed-air returning means so as to close the former when actuating the latter.

5. A safety device for railway vehicles, adapted to be actuated by electric contacts located on the track, comprising in combination an air valve in communication with the compressed-air brake line, said valve being adapted to open automatically when released; means to retain said valve at the closed position; electro-magnetic means to trip said retaining means, said electro-magnetic means being actuated by said electric track contacts; means actuated by compressed air from the brake line to return said air valve to the closed position; an exhaust line from said air valve to the atmosphere; and manual means to control simultaneously and in inverted relation said exhaust line and said compressed-air returning means so as to close the former when actuating the latter.

GUSTAVE LECAT.